United States Patent
Asai et al.

(10) Patent No.: US 8,791,206 B2
(45) Date of Patent: Jul. 29, 2014

(54) POLYPROPYLENE COMPOSITION AND MOLDED ARTICLE OF THE SAME

(71) Applicant: Toyoda Gosei CO., LTD, Kiyosu (JP)

(72) Inventors: Toshihiko Asai, Kiyosu (JP); Hajime Miwa, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/792,447

(22) Filed: Mar. 11, 2013

(65) Prior Publication Data

US 2013/0261263 A1    Oct. 3, 2013

(30) Foreign Application Priority Data

Mar. 29, 2012  (JP) ................................. 2012-075895

(51) Int. Cl.
*C08F 8/00*    (2006.01)
*C08L 23/00*   (2006.01)

(52) U.S. Cl.
USPC ............................ 525/191; 525/240; 524/515

(58) Field of Classification Search
USPC .................................. 525/191, 240; 524/515
See application file for complete search history.

(56) References Cited

U.S. PATENT DOCUMENTS 6,384,137 B1    5/2002    Mizutani et al.

FOREIGN PATENT DOCUMENTS

| JP | H11-130923 A | 5/1999 |
|----|--------------|--------|
| JP | 2001-62861 A | 3/2001 |

*Primary Examiner* — Nathan M Nutter
(74) *Attorney, Agent, or Firm* — Posz Law Group, PLC

(57) ABSTRACT

The present invention relates to a polypropylene composition containing: 100 parts by weight of a blending mixture containing 35 to 45% by weight of a polypropylene copolymer having an ethylene content of 4 to 20% by weight, 7 to 12% by weight of high-density polyethylene, 40 to 50% by weight of an ethylene-α-olefin copolymer rubber, and 5 to 10% by weight of a compatibilizer, and 0.05 to 0.1 parts by weight of a flow adjuster.

4 Claims, No Drawings

POLYPROPYLENE COMPOSITION AND MOLDED ARTICLE OF THE SAME

TECHNICAL FIELD

The present invention relates to a polypropylene composition mainly composed of polypropylene copolymer and having excellent low-temperature impact resistance while maintaining rigidity, and a molded article thereof.

BACKGROUND ART

Polypropylene (PP) compositions mainly composed of polypropylene, in which ethylene-propylene-based rubbers, inorganic fillers and the like are blended, have excellent rigidity and impact resistance and have high moldability, and therefore have been widely used for interior and exterior parts of automobiles or the like. They have also been used for air-bag pads (hereinafter also referred to as AB pads) of automobiles, and characteristics such as fluidity and impact resistance at low temperature are required therefor. In the polypropylene compositions, however, it is generally difficult to achieve both of the rigidity and the low-temperature impact resistance at the same time, and under the present circumstances, one of the characteristics cannot help being sacrificed to some extent.

In Patent Document 1, there is disclosed a polypropylene composition having a structure comprising polypropylene as a matrix phase and an elastomer as a dispersion phase, in which polyethylene is present in the dispersion phase, in order to obtain a balance between the rigidity and the low-temperature impact resistance. However, this compounding system is difficult to be applicable to a molded article particularly requiring fluidity (for example, an AB pad required to have a thick portion and a thin portion).

In Patent Document 2, there is disclosed a composition comprising PP composition comprising polypropylene, low-density polyethylene, an ethylene-olefin copolymer rubber and the like, and a peroxide blended in the PP composition in a predetermined amount, as a material for an AB pad having a thick portion and a thin portion. However, this compounding system is difficult to achieve a balance between the rigidity and the low-temperature impact resistance.

Patent Document 1: JP-A-11-130923
Patent Document 2: JP-A-2001-62861

SUMMARY OF THE INVENTION

Accordingly, an object of the present invention is to provide a polypropylene composition having high fluidity and excellent low-temperature impact resistance while maintaining rigidity, and a molded article thereof.

The present invention provides a polypropylene composition comprising:

100 parts by weight of a blending mixture comprising 35 to 45% by weight of a polypropylene copolymer having an ethylene content of 4 to 20% by weight, 7 to 12% by weight of high-density polyethylene, 40 to 50% by weight of an ethylene-α-olefin copolymer rubber, and 5 to 10% by weight of a compatibilizer, and 0.05 to 0.1 parts by weight of a flow adjuster.

Further, the present invention provides a molded article of the above polypropylene composition.

DETAILED DESCRIPTION OF THE INVENTION

Embodiments of the respective elements in the present invention will be exemplified below.

1. Polypropylene Copolymer

Polypropylene copolymer is a polypropylene block copolymer containing 4 to 20% by weight of ethylene. When the ethylene content is less than 4% by weight, there is a concern that impact strength is decreased or a flow mark caused by deterioration in rubber dispersibility is generated. On the other hand, when the ethylene content exceeds 20% by weight, there is a concern that deterioration in heat resistance or rigidity occurs.

2. High-Density Polyethylene

High-density polyethylene is preferably a polyethylene having a density of 0.96 g/cm$^3$ or more, more preferably, from 0.96 g/cm$^3$ to 0.98 g/cm$^3$. The rigidity of the polypropylene composition can be maintained, and further, the low-temperature impact resistance thereof can also be secured by dispersing the high-density polyethylene in a rubber to reinforce the rubber. When the density is less than 0.96 g/cm$^3$, it becomes difficult to achieve the above effects.

3. Ethylene-α-Olefin Copolymer Rubber

Examples of the α-olefins include propylene, butene, pentene and the like. However, an ethylene-butene copolymer rubber is preferable. This largely contributes to the low-temperature impact resistance.

4. Compatibilizer

Examples of the compatibilizer include a propylene-butene copolymer and an ethylene-propylene copolymer, and the propylene-butene copolymer is preferable. The compatibilizer enhances compatibility between polypropylene copolymer and rubber, and enhances tensile elongation of the rubber.

5. Flow Adjuster

Examples of the flow adjusters include ketone peroxides, peroxyketals, hydroperoxides, dialkyl peroxides, diacyl peroxides, peroxydicarbonates, peroxyesters and the like. However, dialkyl peroxides are preferable.

The fluidity of the polypropylene composition is improved by blending the flow adjuster, because molecular chain of polypropylene copolymer or rubber is broken.

6. Blending Amount

The above described polypropylene copolymer, high-density polyethylene, ethylene-α-olefin copolymer rubber, compatibilizer and flow adjuster are properly blended in such amounts that excellent low-temperature impact resistance can be secured while maintaining rigidity. For example, the polypropylene composition of the present invention comprises a blending mixture comprising 35 to 45% by weight of the polypropylene copolymer, 7 to 12% by weight of the high-density polyethylene, 40 to 50% by weight of the ethylene-α-olefin copolymer rubber, and 5 to 10% by weight of the compatibilizer, and further comprises the flow adjuster in an amount of 0.05 to 0.1 parts by weight based on 100 parts by weight of the blending mixture. The polypropylene composition of the present invention may contain other components such as stabilizer, to the extent that they do not impair the effect of the present invention. Examples of the other components includes phenolic antioxidant, amine thermal stabilizer, sulfur thermal stabilizer, phosphate thermal stabilizer, hindered amine light stabilizer, benzoate ultraviolet absorber, The bending strength and elastic modulus were measured in accordance with ISO 178.

The results of physical property evaluation are shown in Table 1. The samples of Examples show high fluidity and excellent impact resistance even at low temperature while securing the bending elastic modulus. On the other hand, the samples of Comparative Examples 1 and 2 are decreased in the blending amount of high-density polyethylene, so that the impact resistance at low temperature is deteriorated. Further, the sample of Comparative Example 3 contains no compatibilizer, so that the tensile elongation is decreased.

TABLE 1

| | | | Ex. 1 | Ex. 2 | Ex. 3 | Comp. Ex. 1 | Comp. Ex. 2 | Comp. Ex. 3 |
|---|---|---|---|---|---|---|---|---|
| Blending | Polypropylene Copolymer | Ethylene Content: 10.6 wt % | 40 | 40 | 40 | 45 | 50 | 40 |
| | High-Density Polyethylene | Density: 0.967 g/cm$^3$ | 10 | 10 | 10 | 5 | 0 | 10 |
| | Rubber | Ethylene-Butene Rubber | 40 | 40 | 45 | 40 | 40 | 50 |
| | Compatibilizer | Propylene-Butene Copolymer | 10 | 10 | 5 | 10 | 10 | 0 |
| | Flow Adjuster | Dibutyl Peroxide | 0.05 | 0.1 | 0.05 | 0.05 | 0.05 | 0.05 |
| | Others | Stabilizer, etc. | 0.7 | 0.7 | 0.7 | 0.7 | 0.7 | 0.7 |
| Physical Properties | MFR (g/10 min) | 230° C. | 8.29 | 9.78 | 7.42 | 9.76 | 9.18 | 4.65 |
| | Izod Impact Strength with Notch (KJ/m$^2$) | 23° C. | 53.7 | 51.2 | 45.6 | 49.5 | 49.4 | 47.3 |
| | | −45° C. | 75.1 | 81.8 | 91.2 | 18.3 | 20.6 | 95.7 |
| | Tensile Mpa | Yield Strength | 12.0 | 11.3 | 10.0 | 11.6 | 12.3 | 8.8 |
| | | Breaking Strength | >11.6 | >11.1 | >9.5 | >10.9 | >11.5 | 7.9 |
| | % | Breaking Elongation | >510 | >500 | >567 | >557 | >540 | 128 |
| | Bending Mpa | Strength | 10.7 | 10.3 | 9.2 | 11.3 | 11.9 | 8.3 |
| | | Elastic Modulus | 322 | 319 | 298 | 358 | 388 | 293 | benzotriazole ultraviolet absorber, benzophenone ultraviolet absorber, triazine ultraviolet absorber.

Uses

The polypropylene composition of the present invention can be subjected to a known molding treatment such as injection molding, to provide a molded article. As the molded articles of the present invention, there can be exemplified automobile parts such as instrument panels, console boxes and side moldings, as well as the AB pads.

The present invention can provide a polypropylene composition having high fluidity and excellent low-temperature impact resistance while maintaining rigidity, and a molded article thereof.

EXAMPLES

Three kinds of samples for Examples and three kinds of samples for Comparative Examples were prepared by injection molding, by changing the blending amounts of respective components as shown in Table 1.

Physical property evaluation items are melt flow rate (MFR), Izod impact strength, tensile strength and elongation, and bending strength and elastic modulus.

Measurement methods of respective physical property tests will be described below.

The MFR was measured in accordance with ISO 1133 (measurement temperature: 230° C.).

The Izod impact strength (with notch) was measured in accordance with ISO 180 (measurement temperatures: 23° C. and −45° C.).

The tensile strength and elongation were measured in accordance with ISO 527.

While the present invention has been described in detail with reference to the specific embodiments thereof, it will be apparent to one skilled in the art that various changes and modifications can be made therein without departing from the spirit and scope of the present invention.

The present application is based on the Japanese Patent Application No. 2012-075895 filed on Mar. 29, 2012, and the entire contents thereof are incorporated herein by reference. All references cited herein are incorporated in their entirety.

What is claimed is:

1. A polypropylene composition comprising:
   a blended mixture in an amount of 100 parts by weight, the blended mixture comprising:
   35 to 45% by weight of a polypropylene copolymer having an ethylene content of 4 to 20% by weight,
   7 to 12% by weight of high-density polyethylene having a density of 0.96 g/cm$^3$ or more,
   40 to 50% by weight of an ethylene-α-olefin copolymer rubber, and
   5 to 10% by weight of a compatibilizer, and
   a flow adjuster in an amount of 0.05 to 0.1 parts by weight.

2. The polypropylene composition according to claim 1, wherein the ethylene-α-olefin copolymer contains an α-olefin selected from the group consisting of propylene, butene and pentene.

3. The polypropylene composition according to claim 1, wherein the flow adjuster is selected from the group consisting of ketone peroxides, peroxyketals, hydroperoxides, dialkyl peroxides, diacyl peroxides, peroxydicarbonates, and peroxyesters.

4. A molded article comprising the polypropylene composition described in claim 1.

* * * * *